United States Patent Office 3,086,023
Patented Apr. 16, 1963

3,086,023
SULFUR CONTAINING DERIVATIVE OF VITAMIN $B_6$
Gustav Schorre, Darmstadt-Eberstadt, Germany, assignor to E. Merck Aktiengesellschaft, Darmstadt, Germany, a corporation of Germany
No Drawing. Filed May 3, 1961, Ser. No. 107,345
Claims priority, application Germany May 18, 1960
3 Claims. (Cl. 260—294.8)

This invention relates to vitamin $B_6$. More particularly, it is directed to the novel compound, bis-[4-hydroxy-methyl-5-hydroxy-6-methyl-pyridyl-(3)-methyl] - sulfide, having the formula

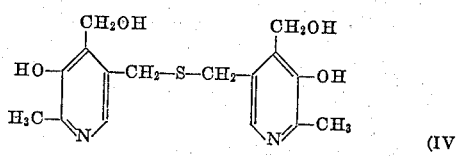

(IV)

This novel compound possesses unusually good central analygesic activity.

Accordingly, it is among the principal objects of this invention to provide the above compound of Formula IV; and method for the preparation thereof.

In preparing the compound, one can start with an acid addition salt of 3,4-bis-bromomethyl-5-hydroxy-6-methyl-pyridine, and react the same in aqueous solution with an aqueous solution of an inorganic sulfide, preferably with an alkali metal or ammonium sulfide, or hydrogen sulfide. The obtained bis-[4-hydroxymethyl-5-hydroxy-6-methyl-pyridyl(3)-methyl]-sulfide may be isolated from the reaction mixture by customary methods.

The sulfide of Formula IV is obtained in very good yield and of great purity.

The synthesis takes place in accordance with the following reaction scheme:

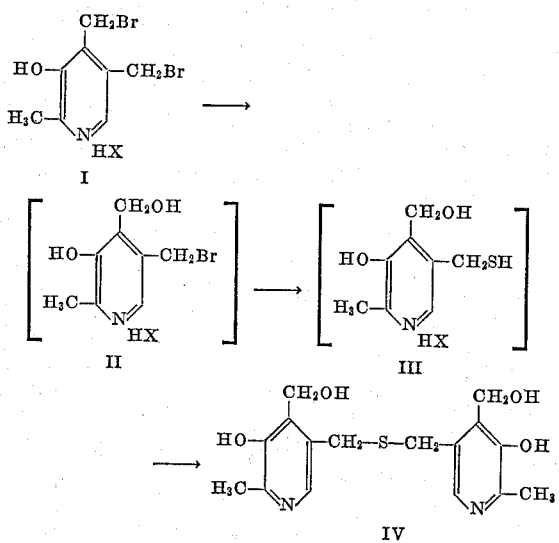

The symbol X designates an acid ion.

The bracketed intermediate products which probably are present in the reaction mixture are not isolated therefrom. The mono-bromide II obviously is readily formed from the aqueous solution of dibromide I; and the mono-bromide in the presence of an aqueous solution of an inorganic sulfide or hydrogen sulfide is then transformed into the mercapto compound III; and the mercapto compound is then transformed under the reaction conditions into the desired sulfide of Formula IV. It has been found suitable to heat the solution of dibromide I for a short period of time, as for example, 15 minutes to a temperature of about 50–70° C., before reacting the same with a sulfide or the hydrogen sulfide. It is advantageous that the previously heated aqueous solution of the dibromide I be added dropwise to the aqueous solution of the sulfide or the hydrogen sulfide. The desired sulfide of Formula IV precipitates from the reaction mixture.

Among the suitable water soluble inorganic sulfides or hydrogen sulfides are, for example, an alkaline earth metal, an alkali metal or ammonium sulfide or a hydrogen sulfide. It is particularly advantageous to employ sodium sulfide or sodium hydrogen sulfide.

The sulfide of Formula IV is filtered off from the reaction mixture. A further quantity of the sulfide IV can be isolated from the filtrate. The sulfide IV can be prepared from the least expensive of starting materials in good yield and of highest purity.

The following are examples in accordance with the invention:

Example I

A solution of 18.5 g. of 3,4-bis-bromomethyl-5-hydroxy-6-methyl-pyridine-hydrobromide in 400 ccm. of water which has been heated to 60° C. for 15 minutes was added dropwise with stirring during the course of 6–7 hours to a solution of 10 g. of KOH in 50 ccm. of water saturated with $H_2S$, and having a temperature of 10–15° C. The precipitated bis-[4-hydroxy-methyl-5-hydroxy-6-methyl-pyridyl-(3)-methyl]-sulfide was removed by suction and washed with acetone. F.P. 219° C.; yield 6.6 g.

To the filtrate there were added 50 ccm. of dioxane, 100 ccm. of concentrated ammonia and 1 g. of animal charcoal; and the mass allowed to stand for 3 days at room temperature. The charcoal was filtered off and the filtrate concentrated. The yield was 1.1 g. of bis-[4-hydroxymethyl-5-hydroxy-6-methyl-pyridyl-(3)-methyl] - sulfide. F.P. 218–220° C. (Total yield: 85%).

Example II 17 g. of NaSH were dissolved in 100 ccm. of water. This solution was added dropwise while stirring during a course of 8 hours into a solution of 37 g. of 3,4-bis-bromomethyl-5-hydroxy-6-methyl-pyridine-hydrobromide in 800 ccm. of water. The precipitate was removed by suction (7.7 g.; F.P. 219–220° C.). To the filtrate were added 100 ccm. of dioxane, 200 ccm. of concentrated $NH_3$ and 2 g. of animal charcoal; and the same allowed to stand for 4 days at room temperature. After separation of the animal charcoal, the filtrate was concentrated to a small volume (100 ccm.) under vacuum; and the bis-[4-hydroxymethyl-5-hydroxy-6-methyl-pyridyl-(3)-methyl] - sulfide removed by suction. Yield: 7.05 g.; F.P. 219° C. (Total yield: 81%).

Example III

To a solution of 200 g. of $Na_2S.H_2O$ in 500 ccm. of water having a temperature of 10–15° C., there were added dropwise while stirring during the course of 6–7 hours, a solution of 185 g. of 3,4-bis-bromo-methyl-5-hydroxy-6-methyl-pyridine-hydrobromide which was preliminarily heated for a quarter of an hour to a temperature of 60° C. The reaction mixture was allowed to stand overnight and the precipitated bis-[4-hydroxy-methyl-5-hydroxy-6-methyl - pyridyl-(3)-methyl]-sulfide was removed by suction. The yield is 50 g.; F.P. 219–220° C.

An additional 8.5 g. of bis-[4-hydroxymethyl-5-hydroxy-6-methyl-pyridyl-(3)-methyl]-sulfide was obtained from the filtrate by adding thereto 500 ccm. of ethanol, 1,000 ccm. of concentrated ammonia and 5 g. of animal charcoal.

Suitable acids to prepare the acid addition salts of compound I are preferably hydrogen halides such as hydrogen chloride and hydrogen bromide.

In analgesic tests on the cornea of rabbits the bis-[4-hydroxymethyl - 5 - hydroxy-6-methyl-pyridyl-(3)-methyl]-sulfide was superior in its central analgesic activity to the well known potent analgetics salicylamide and sodium phenyldimethylpyrazolon - methylaminomethane sulfonate. These two known compounds were 1,5 and 2,6 fold less effective than compound IV (intravenous administration of 4 mg./kg.). The new compound of this invention effects a longer duration of analgesia and possesses a low toxicity. It is used in the form of tablets and dragees containing 250 mg. of the active ingredient.

It will be understood that the foregoing description of the invention and the examples set forth are merely illustrative of the principles thereof. Accordingly, the appended claims are to be construed as defining the invention within the spirit and scope thereof.

I claim:
1. Bis-[4-hydroxymethyl - 5-hydroxy-6-methyl-pyridyl-(3)-methyl]-sulfide.
2. The method of preparing bis-[4-hydroxymethyl-5-hydroxy-6-methyl - pyridyl-(3)-methyl] - sulfide which comprises reacting an aqueous solution of an acid addition salt of 3,4-bis-bromomethyl-5-hydroxy-6-methyl-pyridine with an aqueous solution of an inorganic sulfide selected from the group consisting of alkaline earth metal, alkali metal and ammonium sulfides and the corresponding hydrogen sulfides; and isolating the precipitated bis-[4-hydroxymethyl-5-hydroxy-6-methyl-pyridyl-(3)-methyl]-sulfide from the reaction mixture.
3. Method in accordance with claim 2, wherein the aqueous solution of the 3,4-bis-bromomethyl-5-hydroxy-6-methyl-pyridine is preliminarily heated prior to the interaction with the said sulfide.

References Cited in the file of this patent

Noller: Chemistry of Organic Compounds, 2nd ed. (1957), pp. 114, 278 (Saunders).